(12) United States Patent
Furuta

(10) Patent No.: US 8,982,236 B2
(45) Date of Patent: Mar. 17, 2015

(54) IMAGING APPARATUS

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/264,800

(22) Filed: Apr. 29, 2014

(65) Prior Publication Data

US 2014/0232901 A1 Aug. 21, 2014

Related U.S. Application Data

(63) Continuation of application No. PCT/JP2012/077302, filed on Oct. 23, 2012.

(30) Foreign Application Priority Data

Oct. 31, 2011 (JP) .................................. 2011-239321

(51) Int. Cl.
*H04N 9/73* (2006.01)
*H04N 5/235* (2006.01)
(Continued)

(52) U.S. Cl.
CPC ................. *H04N 9/73* (2013.01); *H04N 9/045* (2013.01); *H04N 9/735* (2013.01); *H04N 2209/045* (2013.01)
USPC ...................... 348/223.1; 348/229.1; 348/272; 348/273

(58) Field of Classification Search
USPC ............................ 348/223.1, 229.1, 272, 273
See application file for complete search history.

(56) References Cited

U.S. PATENT DOCUMENTS

| 5,604,530 | A | 2/1997 | Saito et al. |
| 6,343,146 | B1 | 1/2002 | Tsuruoka et al. |
| 7,633,538 | B2 * | 12/2009 | Beck et al. ..................... 348/272 |

(Continued)

FOREIGN PATENT DOCUMENTS

| JP | 6-105805 A | 4/1994 |
| JP | 8-23542 A | 1/1996 |

(Continued)

OTHER PUBLICATIONS

International Preliminary Report on Patentability issued in PCT/JP2012/077302 dated Aug. 27, 2013.

(Continued)

*Primary Examiner* — Twyler Haskins
*Assistant Examiner* — Quang Le
(74) *Attorney, Agent, or Firm* — Birch, Stewart, Kolasch & Birch, LLP

(57) ABSTRACT

White balance correction is performed on RGB color signals output from an image pickup device that includes a particular color filter array in which RGB color filters are arranged on respective lines and the ratios of the numbers of RGB color filters are different between the lines. For calculation of WB gains used for the white balance correction, not all the pixels of the image pickup device but prescribed lines are used to thinning-read. The WB gains are calculated based on color signals on the thinning-read prescribed lines. As the prescribed lines to be thinning-read, lines having a small degree of color mixture are selected under an imaging condition (a lens f-number and a zoom position) with a high degree of color mixture; lines having relatively even ratios of the numbers of RGB color filters are selected under an imaging condition having a low degree of color mixture.

5 Claims, 14 Drawing Sheets

(51) Int. Cl.
*H04N 5/225* (2006.01)
*H04N 9/04* (2006.01)

(56) References Cited

U.S. PATENT DOCUMENTS

| | | | | |
|---|---|---|---|---|
| 8,164,042 | B2 * | 4/2012 | Tseng et al. | 250/226 |
| 2003/0223001 | A1 | 12/2003 | Maeda et al. | |
| 2004/0212689 | A1 | 10/2004 | Nakajima et al. | |
| 2007/0188632 | A1 | 8/2007 | Kobayashi | |
| 2009/0021597 | A1 | 1/2009 | Kameya | |
| 2011/0279705 | A1 * | 11/2011 | Kuang et al. | 348/229.1 |

FOREIGN PATENT DOCUMENTS

| | | |
|---|---|---|
| JP | 10-243407 A | 9/1998 |
| JP | 2000-32345 A | 1/2000 |
| JP | 2000-308080 A | 11/2000 |
| JP | 2003-116143 A | 4/2003 |
| JP | 2004-7133 A | 1/2004 |
| JP | 2007-53499 A | 3/2007 |
| JP | 2007-221273 A | 8/2007 |
| JP | 2007-295300 A | 11/2007 |
| JP | 2009-27488 A | 2/2009 |
| JP | 2011-101158 A | 5/2011 |
| WO | WO 2007/126033 A1 | 11/2007 |

OTHER PUBLICATIONS

International Search Report (PCT/ISA/210) issued in PCT/JP2012/077302 mailed Jan. 29, 2013.

Written Opinion of the International Searching Authority (PCT/ISA/237) issued in PCT/JP2012/077302 mailed Jan. 29, 2013.

* cited by examiner

FIG.3
(a) 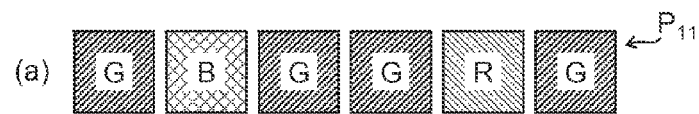
(b) 
FIG.4
(a) 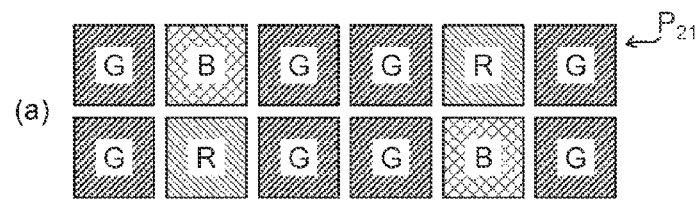
(b) 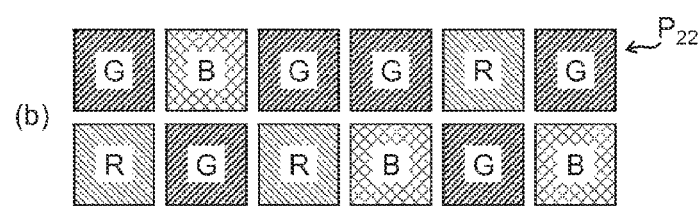
(c) 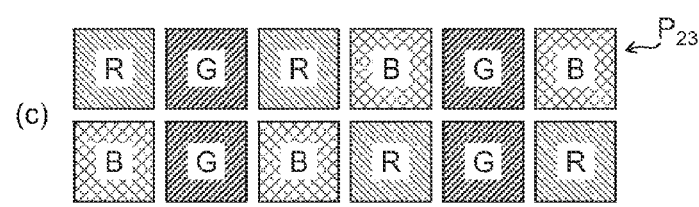

FIG.7

| CORRESPONDENCE DIAGRAM | COMBINATION OF FIGURE 1 | THINNING | THE NUMBER OF R | THE NUMBER OF G | THE NUMBER OF B |
|---|---|---|---|---|---|
| Figure 3(a) | 1 FROM (acdf)<br>0 FROM (be) | 1/6 | 1 | 4 | 1 |
| Figure 3(b) | 0 FROM (acdf)<br>1 FROM (be) | 1/6 | 2 | 2 | 2 |
| Figure 4(a) | 2 FROM (acdf)<br>0 FROM (be) | 2/6 | 2 | 8 | 2 |
| Figure 4(b) | 1 FROM (acdf)<br>1 FROM (be) | 2/6 | 3 | 6 | 3 |
| Figure 4(c) | 0 FROM (acdf)<br>2 FROM (be) | 2/6 | 4 | 4 | 4 |
| Figure 5(a) | 3 FROM (acdf)<br>0 FROM (be) | 3/6 | 3 | 12 | 3 |
| Figure 5(b) | 2 FROM (acdf)<br>1 FROM (be) | 3/6 | 4 | 10 | 4 |
| Figure 5(c) | 1 FROM (acdf)<br>2 FROM (be) | 3/6 | 5 | 8 | 5 |
| Figure 6(a) | 4 FROM (acdf)<br>0 FROM (be) | 4/6 | 4 | 16 | 4 |
| Figure 6(b) | 3 FROM (acdf)<br>1 FROM (be) | 4/6 | 5 | 14 | 5 |
| Figure 6(c) | 2 FROM (acdf)<br>2 FROM (be) | 4/6 | 6 | 12 | 6 |

AMPLIFIER-SHARING PIXELS (2 x 2 PIXELS)

IMAGING APPARATUS

CROSS-REFERENCE TO RELATED APPLICATIONS

This application is a continuation application and claims the priority benefit under 35 U.S.C. §120 of PCT Application No. PCT/JP2012/077302 filed on Oct. 23, 2012 which application designates the U.S., and also claims the priority benefit under 35 U.S.C. §119 of Japanese Patent Application No. 2011-239321 filed on Oct. 31, 2011, which applications are all hereby incorporated by reference in their entireties.

BACKGROUND OF THE INVENTION

1. Field of the Invention

The present invention relates to an imaging apparatus and an image processing method and, in particular, to technologies for speedily and accurately calculating a white balance gain.

2. Description of the Related Art

Japanese Patent Application Laid-Open No. 2007-295300 (hereinafter referred to as PTL 1) discloses an imaging apparatus that calculates a white balance gain (WB gain) on the basis of an image thinned (extracted) from an image in the entire region of an image pickup device, actually takes an image in a part of the image pickup device through electronic zooming, and performs white balance correction with the calculated WB gain. Accordingly, a color temperature is detected from an image in a region having a higher probability that white exists than a region where an image is to be actually taken, thereby allowing a WB gain to be accurately calculated.

Japanese Patent Application Laid-Open No. 2003-116143 (hereinafter referred to as PTL 2) includes description where signals of pixels are thinning-read from a solid image pickup device, or signals of multiple pixels on lines with the same color in the vertical direction are added together and read, and a WB gain is calculated by detecting (an integration process of the level of each color) the read signals.

Incidentally, an image pickup device adopted in each of the imaging apparatuses described in the foregoing PTLs 1 and 2 has a color filter array that is a Bayer array (paragraph [0023] and FIG. 4 in PTL 1, and FIG. 3 in PTL 2).

In the Bayer array, green (G) pixels are arranged checkerwise and red (R) and blue (B) are line-sequentially arranged. Accordingly, there is a problem in that aliasing of a high frequency signal exceeding a reproduction band for each color and deviation in phase of each color cause coloring (color moire) at low frequencies.

In order to solve such a problem, a color image pickup device has been proposed that has a three-color random array satisfying an array limitation condition where any pixel concerned is adjacent to three colors including the color of the pixel concerned on any of four sides of the pixel concerned (Japanese Patent Application Laid-Open No. 2000-308080; PTL 3).

Japanese Patent Application Laid-Open No. 8-23542 (hereinafter referred to as PTL 4) proposes an imaging apparatus that includes G filters having a higher ratio than R filters and B filters to increase the color resolution in the horizontal direction and the vertical direction and reduce color moire in a luminance signal in comparison with the case where color filters with the same ratio are arranged in a lattice structure.

SUMMARY OF THE INVENTION

In an image pickup device having a mosaic color filter array, color mixture occurs due to light leakage from adjacent pixels. The degree of color mixture depends on imaging conditions, such as the focal length and the f-number of an aperture of an imaging lens.

There is a problem in that if a WB gain is calculated on the basis of RGB color signals with a high degree of color mixture, the WB gain cannot be accurately calculated.

In the cases of image pickup devices having Bayer arrays described PTLs 1 and 2, lines of repetition of an RGrRGr sequence and lines of repetition of a GbBGb sequence are alternately arranged. RGB pixels do not coexist on one line. Even if thinning-reading on lines is appropriately changed for calculating a WB gain, thinning-reading resistant to adverse effects of color mixture, thinning-reading susceptible to adverse effects of color mixture and the like cannot be performed.

Meanwhile, in the case of the color image pickup device having the three-color random array described in PTL 3, RGB pixels exist on one line. However, RGB filters are randomly arranged. Accordingly, even if any line is thinning-read during calculation of a WB gain, a color signal affected by color mixture to the same extent is acquired. Thus, a highly accurate WB gain having reduced adverse effects of color mixture cannot be calculated.

In the color filter array described in PTL 4, many G filters are arranged on any of lines in the horizontal and vertical directions. Accordingly, even if any line is thinning-read, the ratios of the numbers of RGB pixels are uneven. When a WB gain is calculated, an integrated mean value of each of RGB color signals is acquired. However, the numbers of pixels to be averaged are different. There is thus a problem in that if the thinning ratio is particularly set high for increasing the speed, the accuracies of the RGB integrated mean values tend to vary, and the WB gain cannot be accurately calculated.

The present invention has been made in view of such situations, and has an object to provide an imaging apparatus and an image processing method that can speedily calculate a highly accurate white balance gain in consideration of adverse effects of noise and adverse effects of color mixture between adjacent pixels, and quickly perform a highly accurate white balance correction.

In order to achieve the object, an imaging apparatus according to an aspect of the present invention includes: an imaging optical system; an image pickup device forming a subject image through the imaging optical system and including a color filter array in which color filters including three primary colors are arranged on two-dimensionally arranged photoelectric conversion elements, the color filters of three primary colors being arranged on each line and the color filter array including a plurality of lines having different ratios of the numbers of color filters of the three primary colors; a white balance gain calculation device for calculating white balance gains on the basis of respective color signals corresponding to the color filters of the respective colors on lines having relatively even ratios of the numbers of color filters of the three primary colors among the plurality of lines; and a white balance correction device for performing white balance correction on the color signals acquired through the image pickup device on the basis of the white balance gains calculate by the white balance gain calculation device.

The one aspect of the present invention calculates white balance gains, using the image pickup device having a specific color filter array where the ratios of the numbers of color filters of the three primary colors are different between the lines, on the basis of the color signals on lines having relatively even ratios of the numbers of color filters of the three primary colors. Accordingly, variation in accuracies (integrated mean values) for detecting three primary colors due to a noise component becomes small, and highly accurate white balance gains can be calculated.

An imaging apparatus according to another aspect of the present invention includes: an imaging optical system; an image pickup device forming a subject image through the imaging optical system and including a color filter array in which color filters including three primary colors are arranged on two-dimensionally arranged photoelectric conversion elements, the color filters of three primary colors being arranged on each line and the color filter array including a plurality of lines having different ratios of the numbers of color filters of the three primary colors; a thinning pattern determination device for determining one thinning pattern according to an imaging condition from among a plurality of thinning patterns for selecting lines to be thinning-read from among the plurality of lines; a white balance gain calculation device for calculating white balance gains on the basis of color signals on lines selected according to the thinning pattern determined by the thinning pattern determination device from among color signals that correspond to the color filters on each line and have been acquired by the image pickup device; and a white balance correction device for performing white balance correction on the color signals acquired through the image pickup device on the basis of the white balance gains calculated the white balance gain calculation device.

The lines with uneven ratios of the numbers of color filters of the three primary colors have a lower degree of color mixture due to light leakage of another color from adjacent pixels than even lines. Accordingly, under an imaging condition with a high degree of color mixture, a thinning pattern for selecting lines with a small degree of color mixture (lines having uneven ratios of the numbers of color filters of the three primary colors) is determined, and white balance gains are calculated according to the determined thinning pattern on the basis of the thinning-read color signals, thus calculating highly accurate white balance gains with reduced adverse effects of color mixture.

In contrast, under an imaging condition with a low degree of color mixture, a thinning pattern for selecting lines with reduced adverse effects of noise (fines with relatively even ratios of the numbers of color filters of the three primary colors) is determined, and white balance gains are calculated according to the determined thinning pattern on the basis of the color signals on the thinning-read lines.

Under an imaging condition with a low degree of color mixture, variation in detection accuracy due to a noise component of each color signal is smaller in the case of relatively even ratios of the numbers of color signals of the three primary colors, thereby allowing highly accurate white balance gains to be calculated. Accordingly, under an imaging condition with a low degree of color mixture, a thinning pattern for selecting lines with relatively even ratios of the numbers of color filters of the three primary colors is determined, thus calculating highly accurate white balance gains according to the determined thinning pattern on the basis of the thinning-read color signals.

In an imaging apparatus according to another aspect of the present invention, it is preferable that the thinning pattern determination device determines one thinning pattern from among the plurality of thinning patterns on the basis of at least one of an f-number and a zoom magnification of the imaging optical system on imaging.

The closer the f-number of the imaging optical system approaches an open f-number, the higher the degree of color mixture becomes. Typically, microlenses for condensing light are arranged on respective photoelectric conversion elements of the image pickup device. These microlenses are arranged so as to be slightly shifted (scaled) from the respective photoelectric conversion elements according to the distances from the center of the image pickup device for the sake of correcting incident angles of light fluxes. If the incident angles on the microlenses deviate from preliminarily assumed incident angles due to a zoom magnification, the degree of color mixture increases. Thus, the other aspect of the present invention determines whether or not the imaging condition has a high degree of color mixture on the basis of at least one of the f-number and the zoom magnification on imaging.

In an imaging apparatus according to still another aspect of the present invention, it is preferable that the thinning pattern determination device includes color temperature detection device for detecting a color temperature of environment light, and determines one thinning pattern from among the plurality of thinning patterns on the basis of the color temperature of the environment light detected by the color temperature detection device. In the case of an intermediate color temperature where the levels of the color signals of the three primary colors are substantially the same, the adverse effects of color mixture against accuracy of calculating white balance gains are small. However, in the case of a low color temperature or a high color temperature, a color mixture component largely affects the accuracy of calculating white balance gains. Thus, the still another aspect of the present invention selects an appropriate thinning pattern on the basis of the color temperature of environment light.

In an imaging apparatus according to still another aspect of the present invention, it is preferable that the thinning pattern determination device determines whether or not the imaging condition includes a high degree of color mixture, determines a thinning pattern for selecting lines having uneven ratios of the numbers of color filters of the three primary colors under an imaging condition with a high degree of color mixture, and determines a thinning pattern for selecting lines having relatively even ratios of the numbers of pixels corresponding to the color filters of the three primary colors under an imaging condition with a low degree of color mixture.

Preferably, an imaging apparatus according to still another aspect of the present invention further includes a sensitivity setting device for setting an imaging sensitivity, wherein the thinning pattern determination device determines a thinning pattern for selecting lines having uneven ratios of the numbers of color filters of the three primary colors if the imaging sensitivity set by the sensitivity setting device is a low sensitivity, and determines a thinning pattern for selecting lines having relatively even ratios of the numbers of color filters of the three primary color filters if the set imaging sensitivity is a high sensitivity.

In the case of a low imaging sensitivity, adverse effects of noise are small. Accordingly, thinning-reading on lines with a small degree of color mixture enables more highly accurate calculation of white balance gains. On the contrary, in the case of a high imaging sensitivity, adverse effects of noise are large. Accordingly, for acquiring the integrated mean values of the respective color signals, thinning-reading on lines with relatively even ratios of the numbers of color filters of the three primary colors enables more highly accurate calculation of white balance gains. Thus, in the still another aspect of the present invention selects a thinning pattern on the basis of the imaging sensitivity.

Preferably, an imaging apparatus according to still another aspect of the present invention further includes a sensitivity setting device for setting an imaging sensitivity, wherein the plurality of thinning patterns include thinning patterns with different thinning ratios, and the thinning pattern determination device determines a thinning pattern having a high thinning ratio from among the thinning patterns having different thinning ratios if the imaging sensitivity set by the sensitivity setting device is a low sensitivity, and the thinning pattern determination device determines a thinning pattern having a low thinning ratio from among the thinning patterns having different thinning ratios if the set imaging sensitivity is a high sensitivity.

In the case of a low imaging sensitivity, the adverse effects of the noise component are small. Accordingly, improvement in operation speed is facilitated by setting the thinning ratio high. On the contrary, in the case of a high imaging sensitivity, the adverse effects of the noise component are reduced by setting the thinning ratio low, thus giving priority to calculation of highly accurate white balance gains rather than improvement in operation speed.

Preferably, an imaging apparatus according to still another aspect of the present invention further includes: a sensitivity setting device for setting an imaging sensitivity; and a determination device for determining whether or not priority is given to an operation speed, wherein the plurality of thinning patterns include thinning patterns having different thinning ratios, and the thinning pattern determination device determines a thinning pattern that have a high thinning ratio and is for selecting lines having uneven ratios of the numbers of color filters of the three primary colors from among the thinning patterns having different thinning ratios if the imaging sensitivity set by the sensitivity setting device is a low sensitivity, determines a thinning pattern that has a high thinning ratio and is for selecting lines having relatively even ratios of the numbers of color filters of the three primary colors from among the thinning patterns having different thinning ratios if the set imaging sensitivity is a high sensitivity and priority is given to an operation speed, and the thinning pattern determination device determines a thinning pattern that has a low thinning ratio and is for selecting lines having uneven ratios of the numbers of color filters of the three primary colors from among the thinning patterns having different thinning ratios if the set imaging sensitivity is a high sensitivity and priority is not given to an operation speed.

If the adverse effects of noise against the accuracy of calculating white balance gains can be reduced even with a high imaging sensitivity, thinning-reading on lines with a small degree of color mixture enables more highly accurate calculation of white balance gains. Accordingly, if priority is not given to the operation speed even with a high imaging sensitivity, the still another aspect of the present invention determines a thinning pattern that has a low thinning ratio and is for thinning-reading lines with a small degree of color mixture. In this case, use of the thinning pattern having a low thinning ratio enables calculation of the integrated mean values of more color signals. Accordingly, the adverse effects of noise against the accuracy of calculating white balance gains can be reduced.

Preferably, an imaging apparatus according to still another aspect of the present invention further includes a calculation device for calculating offset values for respective color signals corresponding to color filters of the three primary colors, wherein the white balance gain calculation device calculates integrated mean values of respective color signals on lines to be used for calculating the white balance gains, subtracts offset values calculated for the respective color signals from the integrated mean values, and calculates the white balance gains on the basis of ratios of subtracted integrated mean values of the respective color signals. The accuracy of calculating the white balance gains can be improved by correcting the offset values for the respective color signals.

In an imaging apparatus according to still another aspect of the present invention, the image pickup device is an image pickup device that has an element structure of sharing an amplifier among a prescribed group of pixels, and the calculation device includes: a first calculation device for calculating offset values at respective positions of the pixels sharing the amplifier relative to the amplifier; and a second calculation device for calculating offset values for respective color signals on the basis of positions of the pixels relative to the amplifier in the thinning pattern determined by the thinning pattern determination device, and the offset values at respective positions relative to the amplifier calculated by the first calculation device. The offset values for the respective color signals can be calculated in consideration of a step between offset components generated by the element structure of a substrate including common amplifiers. The accuracy of calculating white balance gains can be improved by correcting the integrated mean values of the respective color signals with the offset values.

In an imaging apparatus according to still another aspect of the present invention, it is preferable that the color filter array of the image pickup device includes a prescribed basic array pattern where first filters corresponding to a first color most contributing to acquisition of a luminance signal and second filters corresponding to second colors that are at least two colors other than the first color are arranged, and the basic array pattern is repeatedly arranged in a horizontal direction and a vertical direction, the first filters are arranged on respective lines in horizontal, vertical, obliquely upper right, and obliquely lower right directions of the color filter array, at least one of the second filters is arranged on respective lines of the basic array pattern in the horizontal and vertical directions of the color filter array, and a ratio of the number of pixels of the first color corresponding to the first filters is higher than a ratio of the number of pixels of each color of the second colors corresponding to the second filters.

Thus, at least one of the first filters corresponding to the first color most contributing to acquisition of a luminance signal is arranged on respective lines in the horizontal, vertical, obliquely upper right, and obliquely lower right directions of the color filter array. Accordingly, the reproduction accuracy of demosaicing process in a high frequency region can be improved. Furthermore, at least one of the second filters corresponding to the second colors that are at least two colors other than the first color is also arranged on respective lines in the horizontal and vertical directions of the color filter array. Accordingly, occurrence of color moire (false color) is suppressed, thereby allowing a high resolution to be achieved. Moreover, in the color filter array, the prescribed basic array pattern is repeatedly arranged in the horizontal direction and the vertical direction. Accordingly, in the case of demosaicing (interpolation) process in a stage thereafter, processing can be performed according to the repetitive pattern. Thus, the processing in the stage thereafter can be simplified in comparison with the case of a random array.

In an imaging apparatus according to still another aspect of the present invention, it is preferable that the color filter array of the image pickup device includes a prescribed basic array pattern where color filters of red (R), green (G) and blue (B) are arranged, the basic array pattern is repeatedly arranged in a horizontal direction and a vertical direction, the prescribed basic array pattern is a square array pattern corresponding to 6×6 pixels, and the color filter array is configured by alternately arranging first arrays and second arrays in the horizontal direction and the vertical direction, and the first arrays correspond to 3×3 pixels and have G filters arranged at a center and four corners, and B filters arranged vertically and R filters arranged laterally sandwiching the G filter at the center, and the second arrays correspond to 3×3 pixels and have G filters arranged at a center and four corners, and R filters arranged vertically and B filters arranged laterally sandwiching the G filter at the center.

In the color filter array, at least one of the G filters corresponding to the G signal most contributing to acquisition of a luminance signal is arranged on respective lines in the horizontal, vertical, obliquely upper right, and obliquely lower right directions. Accordingly, the reproduction accuracy of a demosaicing process in a high frequency region can be improved. Furthermore, at least one of the R and B filters corresponding to the R signal and the B signal, respectively, is arranged on respective lines in the horizontal and vertical directions. Accordingly, occurrence of color moire (false color) is suppressed, thereby allowing high resolution to be achieved.

In an imaging apparatus according to still another aspect of the present invention, if one line is thinning-read from among each six lines, the plurality of thinning patterns include a thinning pattern for reading lines having ratios of the numbers of RGB color filters of 1:4:1, and a thinning pattern for reading lines having ratios of the numbers of RGB color filters of 1:1:1. This thinning pattern is of 1/6 thinning, the thinning ratio is the highest, the amount of operation of calculating white balance gains is the smallest, and improvement in speed can be achieved.

In an imaging apparatus according to still another aspect of the present invention, if two lines are thinning-read from among each six lines, the plurality of thinning patterns include a thinning pattern for reading lines having ratios of the numbers of RGB color filters of 1:4:1, and a thinning pattern for reading lines having ratios of the numbers of RGB color filters of 1:1:1.

In an imaging apparatus according to still another aspect of the present invention, if three lines are thinning-read from among each six lines, the plurality of thinning patterns include a thinning pattern for reading lines having ratios of the numbers of RGB color filters of 1:4:1, and a thinning pattern for reading lines having ratios of the numbers of RGB color filters of 5:8:5.

In an imaging apparatus according to still another aspect of the present invention, if four lines are thinning-read from among each six lines, the plurality of thinning patterns include a thinning pattern for reading lines having ratios of the numbers of RGB color filters of 1:4:1, and a thinning pattern for reading lines having ratios of the numbers of RGB color filters of 1:2:1. This thinning pattern is of 4/6 thinning, the thinning ratio is low, and the amount of operation of calculating white balance gains increases. However, white balance gains with small adverse effects of noise can be calculated.

An image processing method according to still another aspect of the present invention includes: an image acquisition step of acquiring a mosaic image corresponding to a color filter array through an imaging optical system and an image pickup device in which color filters of three primary colors are arranged, wherein respective lines of the mosaic image includes color signals corresponding to the three primary colors, and ratios of the numbers of pixels corresponding to the three primary colors are different between lines; a white balance gain calculation step of calculating white balance gains on the basis of respective color signals corresponding to the color filters of the respective colors on lines having relatively even ratios of the numbers of color filters of the three primary colors among the plurality of lines of the image pickup device; and a white balance correction step of performing white balance correction on the respective color signals acquired through the image pickup device, on the basis of the white balance gains calculated by the white balance gain calculation step.

An image processing method according to still another aspect of the present invention includes: an image acquisition step of acquiring a mosaic image corresponding to a color filter array through an imaging optical system and an image pickup device in which color filters of three primary colors are arranged, wherein each line of a plurality of lines of the mosaic image includes color signals corresponding to the three primary colors, and ratios of the numbers of pixels corresponding to the three primary colors are different between lines; a thinning pattern determination step of determining one thinning pattern according to an imaging condition from among a plurality of thinning patterns for selecting lines to be thinning-read from among the plurality of lines; a white balance gain calculation step of calculating white balance gains on the basis of color signals on lines selected according to the thinning pattern determined by the thinning pattern determination step among color signals that correspond to the color filters on respective lines and have been acquired by the image pickup device; and a white balance correction step of performing white balance correction on the respective color signals acquired through the image pickup device, on the basis of the white balance gains calculated by the white balance gain calculation step.

The present invention uses an image pickup device including a specific color filter array where the ratios of the numbers of color filters of three primary colors are different between lines. White balance gains are calculated on the basis of the respective color signals corresponding to color filters of the respective colors on the lines with relatively even ratios of the numbers of color filters of the three primary colors. Accordingly, highly accurate white balance gains can be calculated with small adverse effects of the noise component. Under an imaging condition with a high degree of color mixture, white balance gains are calculated on the basis of the color signals on lines with a small degree of color mixture (lines having uneven ratios of the numbers of color filters of the three primary colors). In contrast, under an imaging condition with a low degree of color mixture, white balance gains are calculated on the basis of the color signals on lines with small adverse effects of noise (lines with relatively even ratios of the numbers of color filters of the three primary colors). Accordingly, highly accurate white balance gains can be calculated, and highly accurate white balance correction can be quickly performed.

BRIEF DESCRIPTION OF THE DRAWINGS

FIG. 3 is a diagram showing two thinning patterns in the case of 1/6-thinning.

FIG. 4 is a diagram showing three thinning patterns in the case of 2/6-thinning.

FIG. 7 is a table providing a summary of combinations of lines to be thinning-read in the cases of 1/6-thinning to 4/6-thinning shown in FIGS. 3 to 6 (thinning patterns), respectively, and the ratios of the numbers of RGB pixels in the respective thinning patterns.

FIG. 19 is a diagram showing another embodiment of an image pickup device adopted in an imaging apparatus according to the present invention.

FIG. 20 is a diagram showing still another embodiment of an image pickup device adopted in an imaging apparatus according to the present invention.

DETAILED DESCRIPTION OF THE PREFERRED EMBODIMENTS

Hereinafter, referring to the accompanying drawings, preferred embodiments of imaging apparatuses and image processing methods according to the present invention are described in detail.

[Image Pickup Device]

Figure 1:
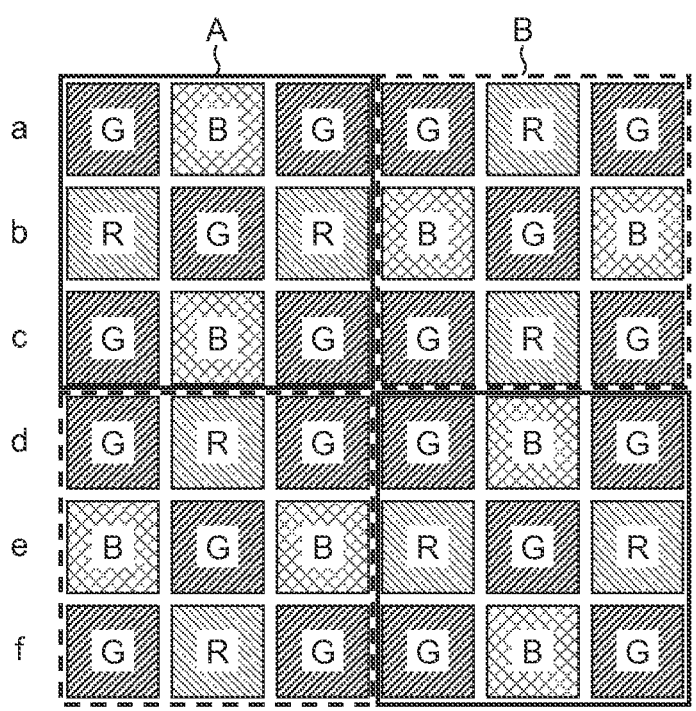
FIG. 1 is a diagram showing an embodiment of an image pickup device adopted in an imaging apparatus according to the present invention.

FIG. 1 is a diagram showing an embodiment of an image pickup device adopted in an imaging apparatus according to the present invention. In particular, this diagram shows a novel color filter array arranged on a photosensitive surface of an image pickup device 1.

The color filter array of the image pickup device 1 includes a basic array pattern having a square array pattern corresponding to 6×6 pixels. This basic array pattern is repeatedly arranged in a horizontal direction and a vertical direction. That is, in this color filter array, respective color filters with red (R), green (G) and blue (B) (R filters, G filters and B filters) are arranged with a prescribed periodicity. Since the R filters, G filters and B filters are thus arranged with the prescribed periodicity, a process can be performed according to the repetitive pattern during image processing and the like on RGB raw data (a mosaic image) read from the image pickup device 1.

In the color filter array shown in FIG. 1, G filters corresponding to a color (the color G in this embodiment) that most contributes to acquire a luminance signal are arranged in each of lines in the horizontal, vertical, obliquely upper right and obliquely lower right directions.

Since the G filters corresponding to luminance pixels are arranged on each of the lines in the horizontal, vertical, obliquely upper right and obliquely lower right directions, reproduction accuracy of a demosaicing process in a high frequency region can be improved irrespective of the direction of high frequencies.

In this color filter array, the R filters and the B filters corresponding to R and B colors other than the color G are arranged on each of lines in the horizontal and vertical directions of the color filter array.

Since the R filters and the B filters are arranged on each of lines in the horizontal and vertical directions of the color filter array, occurrence of color moire (false color) can be suppressed.

If the basic array pattern of 6×6 pixels shown in FIG. 1 are divided into four 3×3 pixels, an array is achieved where A-arrays that include 3×3 pixels and are encompassed by solid line frames and B-arrays that include 3×3 pixels and are encompassed by broken line frames are alternately arranged in the horizontal and vertical directions.

In each of the A-arrays and the B-arrays, G filters are arranged at the four corners and the center, i.e., on both the diagonal lines. In the A-array, R filters are arranged in the horizontal direction and B filters are arranged in the vertical direction sandwiching the G filter at the center. Meanwhile, in the B-array, B filters are arranged in the horizontal direction and R filters are arranged in the vertical direction sandwiching the G filter at the center. That is, in the A-array and the B-array, the positional relationships of the R filters and the B filters are replaced with each other, but the other arrangement is analogous.

The G filters at the four corners of the A-arrays and the B-arrays configure square-arrayed G filters corresponding to 2×2 pixels through alternate arrangement of the A-arrays and the B-arrays in the horizontal and vertical directions.

[Imaging Apparatus]

Figure 2:
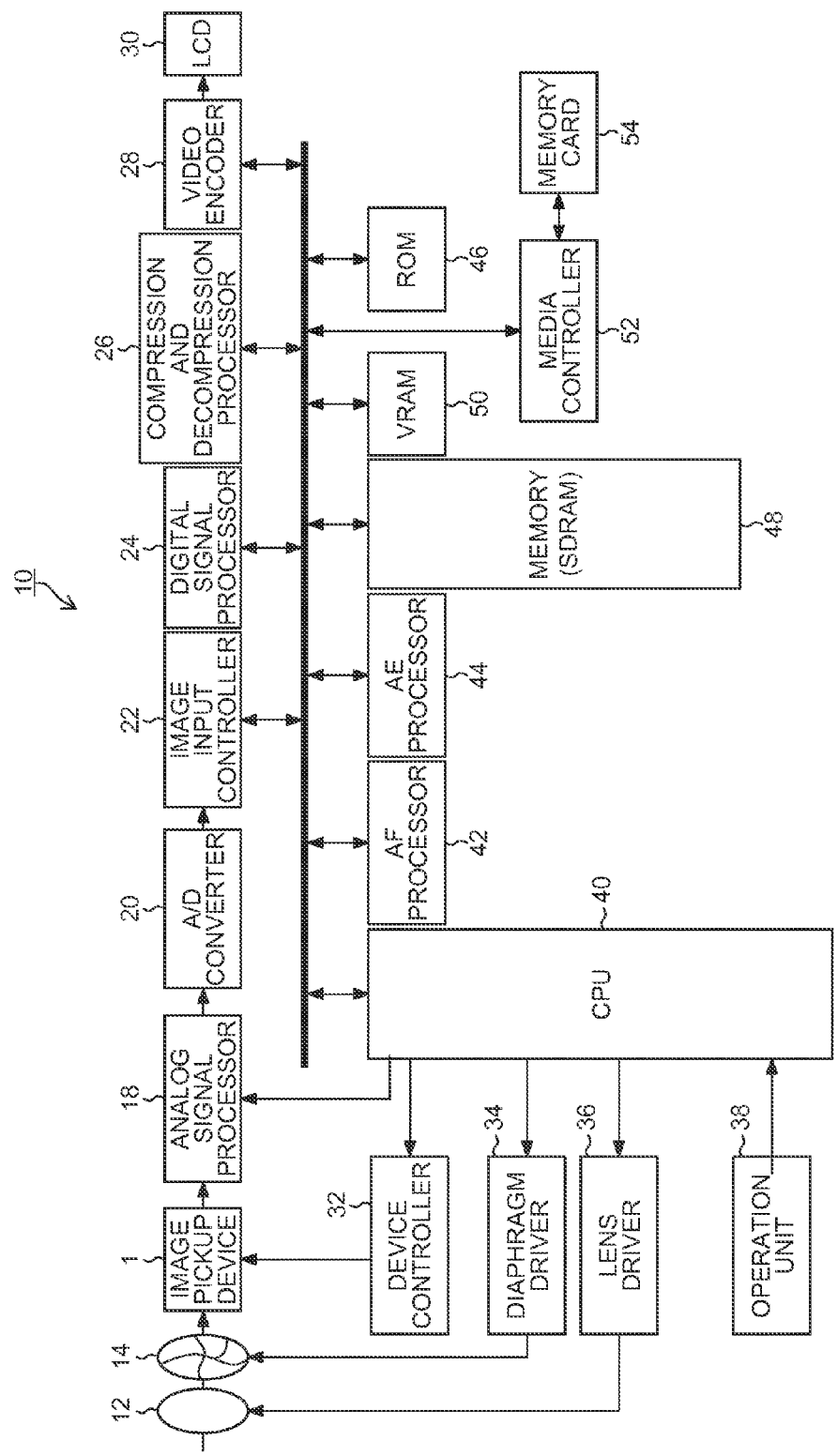
FIG. 2 is a block diagram showing an embodiment of the imaging apparatus according to the present invention.

FIG. 2 is a block diagram showing an embodiment of an imaging apparatus according to the present invention.

This imaging apparatus 10 is provided with the image pickup device 1 shown in FIG. 1, and is a digital camera capable of taking still images and moving images. The operation of the entire apparatus is integrally controlled by a central processing unit (CPU) 40.

The imaging apparatus 10 is provided with an operation unit 38 including a shutter release button, a mode dial, a playback button, a MENU/OK key, a cross key, and a BACK key and the like. A signal from the operation unit 38 is input into the CPU 40. The CPU 40 controls each circuit in the imaging apparatus 10 on the basis of the input signal. For instance, lens drive control, diaphragm drive control, imaging operation control, image processing control, image data recording/reproducing control, display control on a liquid crystal monitor 30 for displaying and the like are performed.

The shutter release button is an operation button through which an instruction of starting imaging is input, and has a two-stroke switch configuration including an S1 switch that is turned on by being half-pressed and an S2 switch that is turned on by being full-pressed. The mode dial is selection device for selection from among an imaging mode, scenery positions, such as for a person, scenery and a night view, a moving image mode and the like.

The playback button is a button for switching to a playback mode for displaying taken and recorded images or moving images on the liquid crystal monitor 30. The MENU/OK key is an operation key including both a function as a menu button for issuing an instruction of displaying a menu on the screen of the liquid crystal monitor 30 and a function as an OK button for issuing an instruction of confirmation and execution of selected details. The cross key is an operation unit through which instructions in four directions including upper, lower, left and right directions are input, and functions as a button (cursor movement operation device) for issuing an instruction of selecting an item from the menu screen and an instruction of selecting any of various setting items in each menu. The upward and downward key of the cross key functions as a zoom switch during imaging, or as a playback zoom switch in the playback mode. The left and right key functions as a frame feed (feeding in the forward direction/backward direction) button in the playback mode. The BACK key is used for deleting a desired object, such as a selected item, canceling instructed details, or transition back to the previous operation state.

In the imaging mode, image light representing a subject is image-formed on a photosensitive surface of the image pickup device 1 through an imaging optical system (zoom lens) 12 and a diaphragm 14. The imaging optical system 12 is driven by a lens driver 36 controlled by the CPU 40; focus control, zoom control and the like are performed. The diaphragm 14 includes e.g. five aperture vanes, is driven by a diaphragm driver 34 controlled by the CPU 40, and, for instance, is subjected to diaphragm control of seven steps concerning f-numbers from F1.4 to F11 on one-AV-step basis.

The CPU 40 controls the diaphragm 14 through the diaphragm driver 34, controls charge accumulation time (shutter speed) in the image pickup device 1 through a device controller 32 and performs control of reading image signals from the image pickup device 1 and the other control.

Signal charges accumulated in the image pickup device 1 are read as voltage signals according to the signal charges on the basis of read signals applied from the device controller 32. The voltage signals read from the image pickup device 1 are applied to the analog signal processor 18, where R, G and B signals in each pixel are sample-held, amplified with a gain (corresponding to ISO sensitivity) designated by the CPU 40 and subsequently applied to an A/D converter 20. The A/D converter 20 converts sequentially input R, G and B signals into digital R, G and B signals, and outputs the signals to an image input controller 22.

The digital signal processor 24 performs prescribed signal processes, such as color mixture correction, white balance correction, a gamma correction process, a demosaicing process (a process of interpolating spatial deviation of color signals due to arrangement of primary color filters and converting the color signals into a simultaneous type), a YC process (a process of generating luminance data and color difference data of image data), and sharpness correction, on digital image signals input through the image input controller 22.

In FIG. 2, reference numeral 46 designates a ROM (EEPROM) stored with a camera controlling program, various parameters and tables and the like used for image processing and the like.

The digital signal processor 24 includes a processor for calculating white balance gains (hereinafter, referred to as "WB gains") and the like used for white balance correction. Details of WB gain calculation are described later.

The image data processed in the digital signal processor 24 is output to a VRAM 50. The VRAM 50 includes an A region and a B region each of which stores image data representing one frame of an image. In the VRAM 50, image data representing one frame of an image is rewritten alternately in the A region and the B region. The written image data is read from a region other than one of the A region and the B region of the VRAM 50, the one including image data being rewritten. The image data read from the VRAM 50 is encoded by a video encoder 28, output to the liquid crystal monitor 30 that is provided on the back of the camera and is for displaying images. Thus, a subject image (live view image) is displayed on the display screen of the liquid crystal monitor 30.

Upon a first stage pressing (half-pressing) of the shutter release button of the operation unit 38, the image pickup device 1 starts AF operation and AE operation, and performs control through the lens driver 36 such that the focusing lens in the imaging optical system 12 reaches an in-focus position. Image data output from the A/D converter 20 upon half-pressing of the shutter release button is captured by an AE detector 44.

The AE detector 44 integrates G signals for the entire screen, or integrates G signals weighted in manners different between at the center portion of the screen and at peripheral portions, and outputs the integrated value to the CPU 40. The CPU 40 calculates the brightness of the subject (imaging EV value) on the basis of the integrated value input from the AE detector 44, and determines the aperture value (f-number) and the electronic shutter (shutter speed) of the image pickup device 1 on the basis of the imaging EV value according to a prescribed program chart.

Here, in the program chart, an imaging (exposure) condition including combinations of f-numbers and shutter speeds, or combinations of these and imaging sensitivities (ISO sensitivities), according to brightness of a subject, are designed. An image with an appropriate brightness can be taken by imaging at an imaging condition determined according to the program chart irrespective of the brightness of the subject.

The CPU 40 controls the diaphragm 14 through the diaphragm driver 34 on the basis of an f-number determined according to the program chart, while controlling the charge accumulation time in the image pickup device 1 through the device controller 32 on the basis of the determined shutter speed.

An AF processor 42 is a portion for performing a contrast AF process, for instance, extracts high frequency components of a piece of image data in a prescribed focus region in image data, and integrates the high frequency components, thereby calculating an AF evaluation value representing an in-focus state. The AF control is performed by controlling the focusing lens in the imaging optical system 12 so as to maximize the AF evaluation value.

Upon a second stage pressing (full-pressing) after completion of the AE operation and the AF operation, image data output from the A/D converter 20 is input into a memory (SDRAM) 48 through the image input controller 22 in response to the pressing, and temporarily stored.

The image data temporarily stored in the memory 48 is appropriately read by the digital signal processor 24. The digital signal processor 24 performs prescribed signal processing, such as color mixture correction, white balance correction, a gamma correction process, a demosaicing process, an YC process, sharpness correction, on the read digital image signals, and causes YC-processed YC data to be stored in the memory 48 again.

Each piece of the YC data stored in the memory 48 is output to a compression and decompression processor 26, where a prescribed compression process, such as of a JPEG (joint photographic experts group), is executed, and subsequently an Exif file is generated and stored in a memory card 54 via a media controller 52.

[Thinning Pattern]

Color signals on lines thinning-read according to a prescribed thinning pattern from among lines acquired from the image pickup device 1 are used as respective RGB color signals to be used for automatic white balance (AWB) correction and the like for the sake of speed-oriented operation (reducing the amount of operation).

Hereinafter, multiple thinning patterns corresponding to lines to be thinning-read from among lines of a mosaic image acquired from the image pickup device 1 are described.

<1/6 Thinning>

As shown in FIG. 1, in the case of a color filter array where basic array patterns of 6×6 pixels are repeatedly arranged in the horizontal direction and the vertical direction, six types of lines a to f are repeated.

Each pairs of the lines a and c and the lines d and f among these lines a to f is a pair including the same filter arrangement. The lines a and c, and the lines d and f have the same filter arrangement even though their phases are different by three pixels. The lines b and e have the same filter arrangement even though their phases are different by three pixels.

As shown in FIG. 3, in the case of thinning-reading one line for each six lines (1/6 thinning), there are a thinning pattern $P_{11}$ ((a) portion in FIG. 3) for reading any one line from among the lines a, c, d and f, and a thinning pattern $P_{12}$ ((b) portion in FIG. 3) for reading any one line from among the lines b and e.

The thinning pattern $P_{11}$ and the thinning pattern $P_{12}$ have different ratios of the numbers of RGB color filters. In the case of the thinning pattern $P_{11}$, R:G:B=1:4:1. In the case of the thinning pattern $P_{12}$, R:G:B=2:2:2=1:1:1.

That is, in the case of the thinning pattern $P_{11}$, the ratios of the numbers of RGBs are uneven, and the G ratio is higher than R and B ratios (four times higher). Meanwhile, in the case of the thinning pattern $P_{12}$, the R and B ratios are higher than those of the thinning pattern $P_{11}$, and the ratios of the numbers of RGBs are even.

For acquiring WB gains, first, the mean value of each of RGB color signals (pixel values of pixels for respective RGB colors) is acquired. The higher the number of pixels to be averaged is, the higher the accuracy of the mean value can be acquired.

In the case where the color temperature of environment light upon imaging is a low color temperature, the mean value for each color has a relationship of R>G>B. In the case of a high color temperature, the mean value for each color has a relationship of R<G<B. Thus, in the case of a color temperature including a color with a low output (a low color temperature or a high color temperature), the accuracy of B pixels or R pixels is low. Accordingly, it is preferred to increase the number of pixels to be averaged.

That is, in the case of a color temperature including a color with a low output, the thinning pattern $P_{12}$ having higher numbers of R and B pixels (RGB pixels are even) is preferable to the thinning pattern $P_{11}$ having lower numbers of R and B pixels.

Meanwhile, in the case of the thinning pattern $P_{12}$, a G pixel is adjacent to R pixels or B pixels in the lateral direction (sandwiched by R pixels or B pixels). Accordingly, this pattern is susceptible to light leakage (color mixture) from adjacent pixels. In the case of the thinning pattern $P_{11}$, the degree of color mixture due to color leakage of different colors from adjacent pixels is smaller than that of the thinning pattern $P_{12}$. Accordingly, this pattern $P_{11}$ is not susceptible to color mixture. Therefore, under an imaging condition where color mixture tends to occur, the thinning pattern $P_{11}$ is preferable.

The present invention determines the optimal thinning pattern from among the multiple thinning patterns $P_{11}$ and $P_{12}$ having different ratios of the numbers of RGBs according to the imaging condition, thinning-reads color signals on prescribed lines according to the determined thinning pattern, acquires the mean value for each of RGB colors, and calculates WB gains on the basis of the acquired mean values. Note that details on selection of the thinning pattern and calculation of WE gains are described later.

<2/6 Thinning>

FIG. 4 shows three thinning patterns $P_{21}$, $P_{22}$ and $P_{23}$ in the case of thinning-reading two lines for each six lines (2/6 thinning).

The (a) portion of FIG. 4 shows the thinning pattern $P_{21}$ for reading two lines from among the lines a, c, d and f shown in FIG. 1. The (b) portion of FIG. 4 shows the thinning pattern $P_{22}$ for reading one line from among the lines a, c, d and f and reading one line from among the lines b and c. The (c) portion of FIG. 4 shows the thinning pattern $P_{23}$ for reading two lines b and e.

The foregoing three thinning patterns $P_{21}$, $P_{22}$ and $P_{23}$ have different ratios of the numbers of RGB color filters. In the case of the thinning pattern $P_{21}$, R:G:B=2:8:2=1:4:1. In the case, of the thinning pattern $P_{22}$, R:G:B=0:3:6:3=1:2:1. In the case of the thinning pattern $P_{23}$, R:G:B=4:4:4=1:1:1.

<3/6 Thinning>

Figure 5:
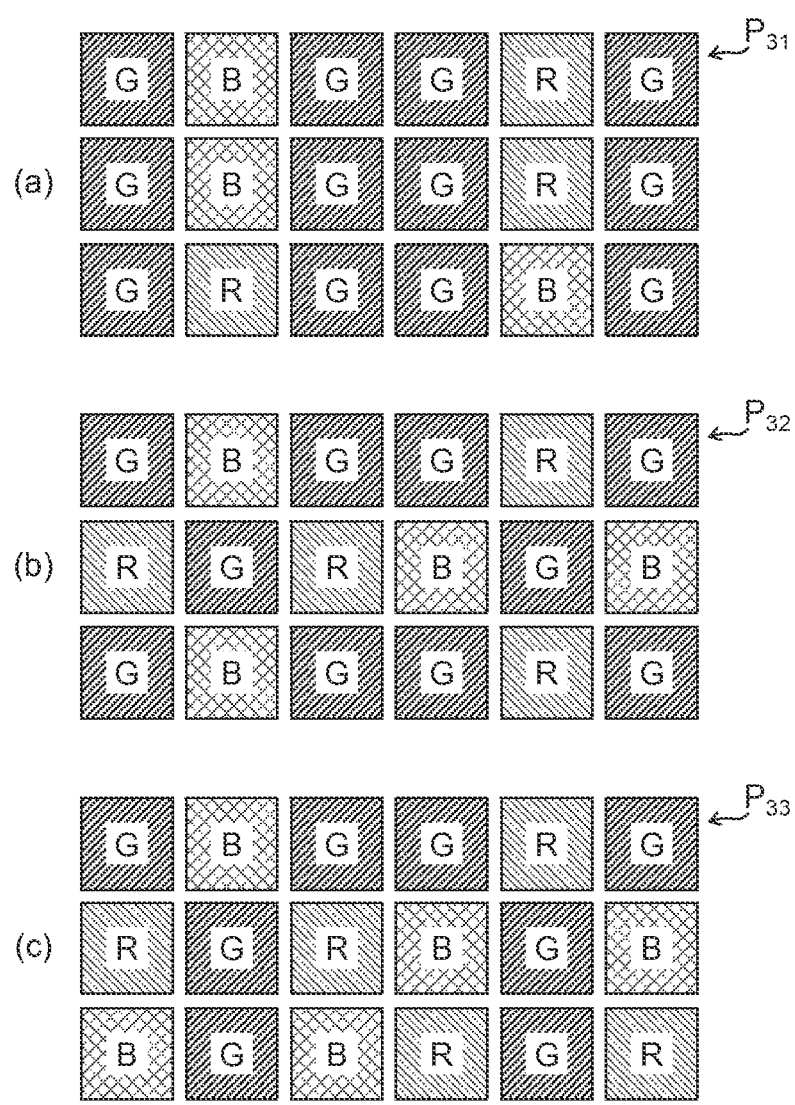
FIG. 5 is a diagram showing three thinning patterns in the case of 3/6-thinning.

FIG. 5 shows three thinning patterns $P_{31}$, $P_{32}$ and $P_{33}$ in the case of reading three lines for each six lines (3/6 thinning).

The (a) portion of FIG. 5 shows the thinning pattern $P_{31}$ for reading three lines from among the lines a, c, d and f shown in FIG. 1. The (b) portion of FIG. 5 shows the thinning pattern $P_{21}$ for reading two lines from among the lines a, c, d and f and reading one line from among the lines b and e. The (c) portion of FIG. 5 shows the thinning pattern $P_{33}$ for reading one line from among the lines a, c, d and f and reading the two lines b and e.

The three thinning patterns $P_{31}$, $P_{32}$ and $P_{33}$ have different ratios of the numbers of RGB color filters. In the case of the thinning pattern $P_{31}$, R:G:B=3:12:3=1:4:1. In the case of the thinning pattern $P_{32}$, R:G:B=4:10:4=2:5:2. In the case of the thinning pattern $P_{33}$, R:G:B=5:8:5.

<4/6 Thinning>

Figure 6:
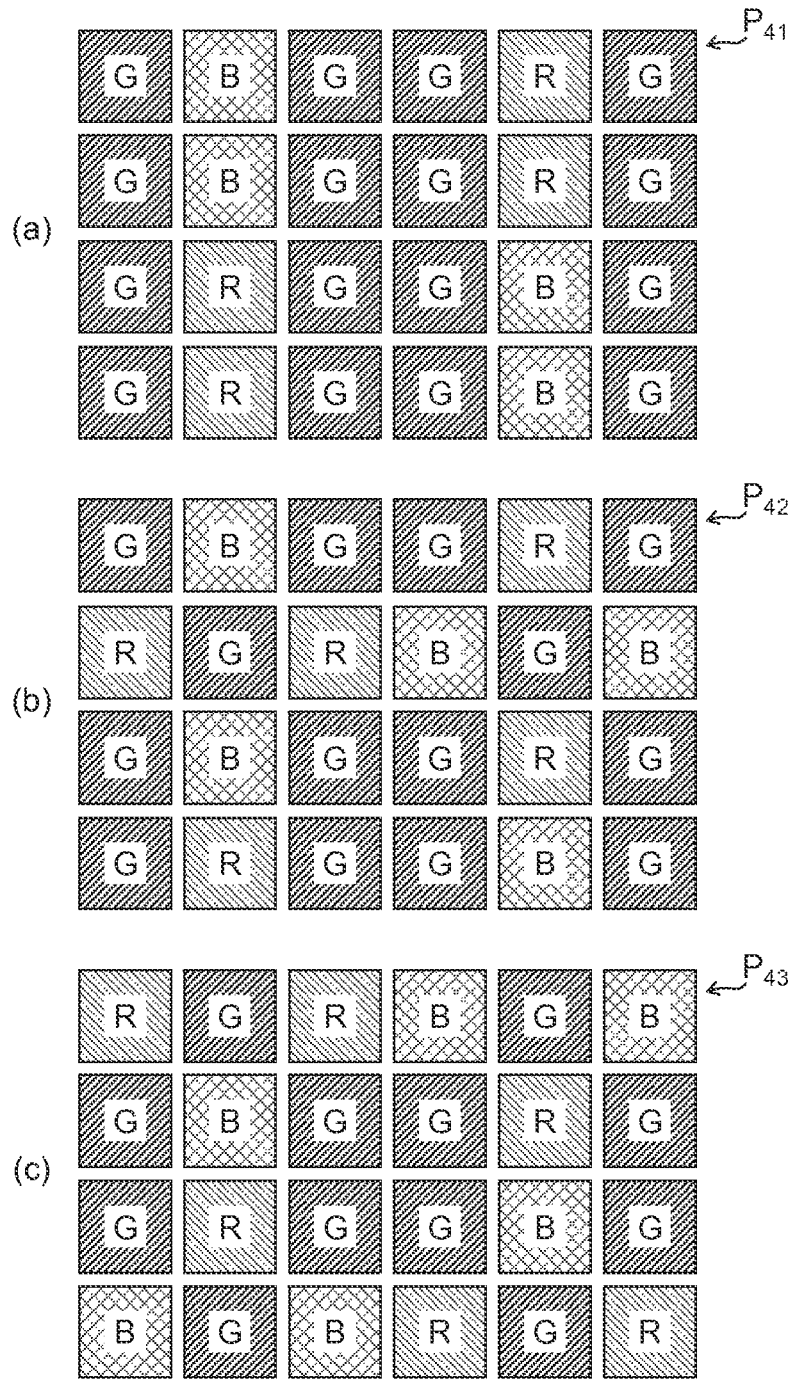
FIG. 6 is a diagram showing three thinning patterns in the case of 4/6-thinning.

FIG. 6 shows three thinning patterns $P_{41}$, $P_{42}$ and $P_{43}$ in the case of thinning-reading four lines for each six lines (4/6 thinning).

The (a) portion of FIG. 6 shows the thinning pattern $P_{41}$ for reading four lines a, c, d and f shown in FIG. 1. The (b) portion of FIG. 6 shows the thinning pattern $P_{42}$ for reading three lines from among the lines a, c, d and f and reading one line from among the lines b and c. The (c) portion of FIG. 6 shows the thinning pattern $P_{43}$ for reading two lines from among the lines a, c, d and f and reading the two lines b and e.

The three thinning patterns $P_{41}$, $P_{42}$ and $P_{43}$ have different ratios of the numbers of RGB color filters. In the case of the thinning pattern $P_{41}$, R:G:B=4:16:4=1:4:1. In the case of the thinning pattern $P_{42}$, R:G:B=5:14:5. In the case of the thinning pattern $P_{43}$, R:G:B=6:12:6=1:2:1.

FIG. 7 is a table providing a summary of combinations of lines to be thinning-read in the cases of 1/6-thinning to 4/6-thinning shown in FIGS. 3 to 6 (thinning patterns), respectively, and the ratios of the numbers of RGB pixels in each thinning pattern.

Among the 1/6 thinning to 4/6 thinning, the 1/6 thinning has the highest thinning ratio (small number of lines to be read) and the smallest amount of operation but has a low accuracy against noise. The 4/6 thinning has the lowest thinning ratio (large number of lines to be read) and the largest amount of operation but has a high accuracy against noise.

[Digital Signal Processing]

Figure 8:
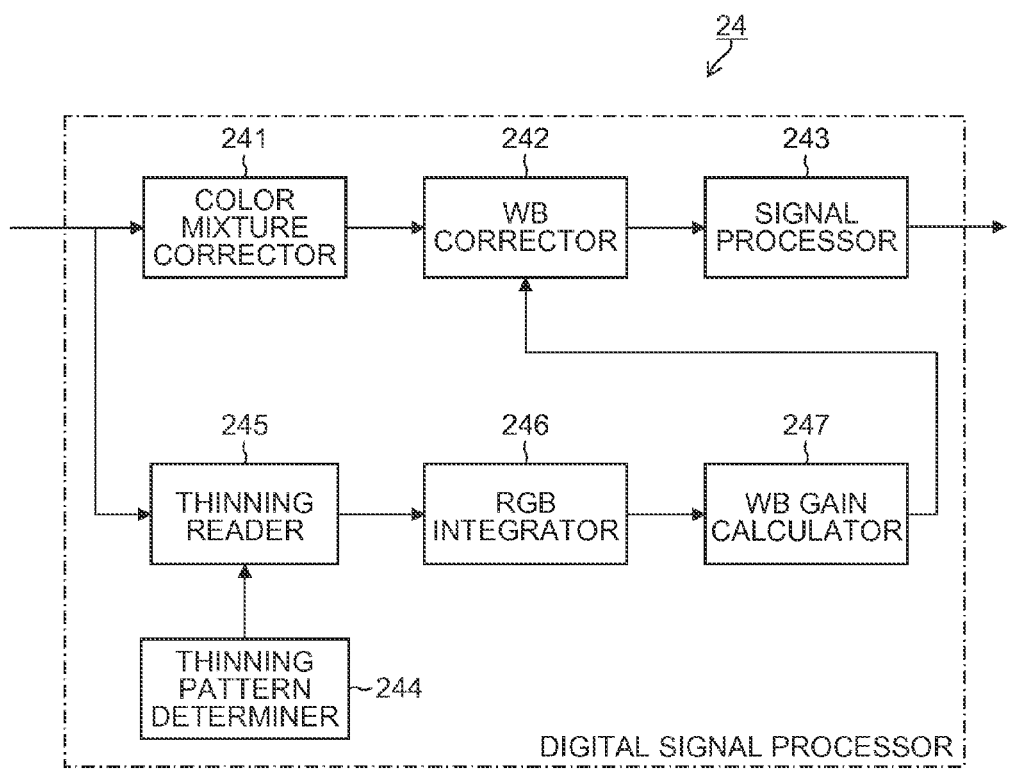
FIG. 8 is a block diagram principally showing an internal configuration of a digital signal processor shown in FIG. 2.

FIG. 8 is a block diagram principally showing the internal configuration of the digital signal processor 24 shown in FIG. 2.

As shown in FIG. 8, the digital signal processor 24 principally includes: a first signal processing system including a color mixture corrector 241, a white balance corrector 242 and a signal processor 243; and a second signal processing system including a thinning pattern determiner 244, a thinning reader 245, a RGB integrator 246 and a WB gain calculator 247.

As described above, raw data (a mosaic image), which is as with the color filter array output from the image pickup device 1 upon imaging, is temporarily stored in the memory 48. The digital signal processor 24 reads the mosaic image from the memory 48, and generates images to be displayed and recorded.

Each of the first signal processing system and the second signal processing system of the digital signal processor 24 appropriately reads the mosaic image (RGB color signals) from the memory 48, and performs parallel processing for enhancing speed.

The color mixture corrector 241 is a portion for performing a process of reducing adverse effects of light leakage (color mixture) from adjacent pixels, and reduces color mixture by subtracting signal components of RGB color signals according to the ratios of leakage from the adjacent pixels. The ratios of leakage from the adjacent pixels vary according to the incident angles of light fluxes onto the pixels and the like. Accordingly, it is required that while the incident angle is varied, the ratios of color mixtures are preliminarily measured at multiple incident angles, and the measured ratios of color mixture (correction parameters) are used.

The RGB color signals having been subjected to color mixture correction by the color mixture corrector 241 are applied to the white balance corrector 242. The WB gain for each of RGB from the WB gain calculator 247 is applied to the other input of the white balance corrector 242. The white balance corrector 242 performs white balance correction by multiplying the RGB color signals by the respective WB gains for RGB.

The white-balance-corrected RGB color signals are applied to the signal processor 243, which performs another type of signal processing, such as a gamma correction process, a demosaicing process, an YC process, and sharpness correction. The YC-processed YC data is stored in the memory 48 again. The YC data stored in the memory 48 is converted by the video encoder 28 into signals to be displayed on the liquid crystal monitor 30, displayed as a post view image on the liquid crystal monitor 30, subjected to a prescribed compression process by the compression and decompression processor 26 to generate an Exif file, which is then recorded in the memory card 54 through the media controller 52.

Meanwhile, the thinning pattern determiner 244 on the second signal processing system side determines one thinning pattern from among the multiple thinning patterns shown in FIGS. 3 to 6 on the basis of the imaging condition and the like. For instance, under the condition of a high degree of color mixture, a thinning pattern where the lines a, c, d and f are mainly selected is determined. Under the condition of a low degree of color mixture, a thinning pattern where the lines b and e are mainly selected is determined. The details of operation of the thinning pattern determiner 244 are described later.

The thinning reader 245 thinning-reads color signals on prescribed lines of from the raw data (a mosaic image) stored in the memory 48, according to the thinning pattern determined by the thinning pattern determiner 244, and outputs each of the read RGB color signals to the RGB integrator 246.

The RGB integrator 246 calculates the integrated mean value of each of the RGB color signals in each of divided areas acquired by dividing one screen into 8×8 or 16×16, and calculates color information including the ratios (R/G and B/G) of the RGB integrated mean values. For instance, in the case of dividing one screen into 16×16, which are 256 divided area, 256 pieces of color information (R/G and B/G) are calculated.

The WB gain calculator 247 calculates WB gains on the basis of the color information (R/G and B/G) on each divided area input from the RGB integrator 246. More specifically, the barycentric position of a distribution of the respective pieces of color information in the 256 divided areas in a color space with R/G and B/G axes coordinates is calculated, and the color temperature of environment light is estimated from the color information represented by the barycentric position. The light source type may be estimated by acquiring a light source type including color information indicated by the barycentric position, for instance, a blue sky, shade, sunny weather, fluorescent light (daylight, neutral white, white, warm white), tungsten, low tungsten and the like, instead of the color temperature (see Japanese Patent Application Laid-Open No. 2007-53499). Furthermore, the color temperature may be estimated from the estimated light source type.

The WB gain calculator 247 is preliminarily provided with the WB gain for each of RGB or each of RB for appropriate white balance correction in conformity with the color temperature of environment light or with a light source type. The WB in calculator 247 reads the WB gain for each of the corresponding RGB or RB on the basis of the estimated color temperature of the environment light or the light source type, and outputs the read WB gain to the white balance corrector 242.

As described above, in parallel with the signal processing on the mosaic image by the first signal processing system, the WB gains are thus calculated by the second signal processing system. Accordingly, the speed of the signal processing can be enhanced. In particular, the WB gains are calculated on the basis of the color signals on the thinning-read lines without using data on all the pixels of the original image. Accordingly, the WB gains can be calculated at high speed. Thus, a post view image for verifying a taken image can be viewed quickly.

On the second signal processing system side, color mixture correction, which has a large amount of operation, is not performed. In contrast, under an imaging condition where color mixture tends to occur, the color signals on lines resistant to color mixture is thinning-read. Accordingly, highly accurate WB gains can be calculated.

[Embodiment of WB Gain Calculation]

First Embodiment

Figure 9:
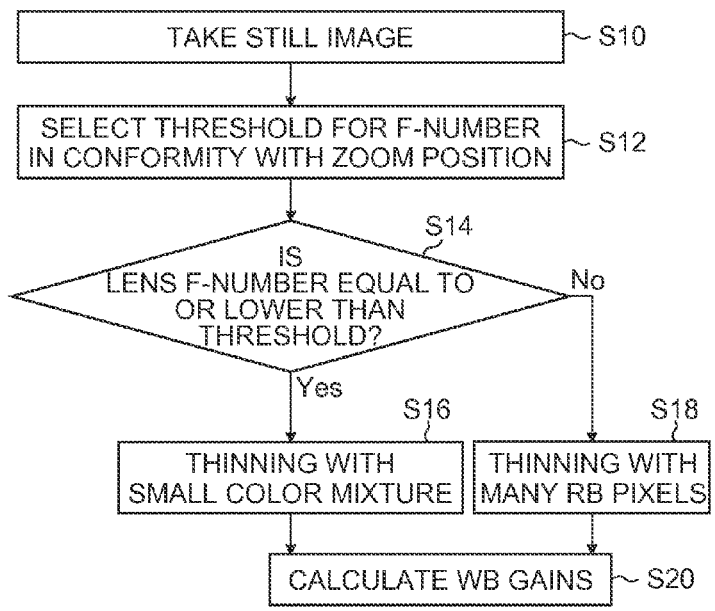
FIG. 9 is a flowchart showing a first embodiment of a method of calculating WB gains.

FIG. 9 is a flowchart showing a first embodiment of calculating WB gains.

Referring to FIG. 9, upon second stage pressing (full pressing) of the shutter release button, a still image is actually taken, and raw data acquired from the image pickup device 1 in the actual imaging is stored in the memory 48 (step S10).

Subsequently, the zoom position and the lens f-number of the imaging optical system 12 (zoom lens) on the actual imaging are acquired, and a threshold in conformity with the acquired zoom position and the lens f-number is selected (step S12).

That is, the nearer the lens f-number approaches to the open f-number, the higher the degree of color mixture becomes. Accordingly, a threshold for determining whether color mixture tends to occur or not is set on the basis of the f-number. According to the zoom position (zoom magnification) of the zoom lens, the incident angles on microlenses on the image pickup device vary (light leakage from adjacent pixels vary), and the amount of color mixture becomes different. Thus, the threshold is configured to be changed in conformity with the zoom position. More specifically, a threshold table including f-numbers and zoom positions as parameters is preliminarily provided, and a corresponding threshold is read from the table on the basis of the f-number and the zoom position on actual imaging.

Next, it is determined if the f-number on actual imaging is equal to or lower than the selected threshold (step S14). If the f-number on actual imaging is equal to or lower than the threshold (in the case of "Yes"), it is determined that color mixture tends to occur, and a thinning pattern corresponding to thinning-reading on lines resistant to color mixture (with small numbers of R and B pixels) is determined. According to the determined thinning pattern, color signals on the prescribed lines are thinning-read (step S16). For instance, in the case of 1/6 thinning, the thinning pattern $P_{11}$ shown in the (a) portion of FIG. 4 is determined, and the color signals on lines corresponding to the selected thinning pattern $P_{11}$ are read.

In contrast, if the f-number on actual imaging exceeds the threshold (in the case of "No"), it is determined that the adverse effects of color mixture are small, a thinning pattern corresponding to thinning-reading on lines having more R and B pixels than lines resistant to color mixture is determined. According to the determined thinning pattern, the color signals of the prescribed lines are thinning-read (step S18). For instance, in the case of 1/6 thinning, the thinning pattern $P_{12}$ shown in the (b) portion of FIG. 4 is determined, and the color signals on the lines corresponding to the selected thinning pattern $P_{12}$ are read.

The integrated mean value for each of RGB is calculated from the RGB color signals read in step S16 or S18, and WB gains are calculated on the basis of the integrated mean values (step S20).

Under the imaging condition where color mixture tends to occur as described above, the color signals on lines resistant to color mixture are thinning-read and WB gains are thus calculated. Accordingly, highly accurate WB gains can be calculated. Under the imaging condition with small adverse effects of color mixture, the color signals on lines (lines with relatively even ratios of RGB pixels) having more R and B pixels than lines resistant to color mixture are thinning-read and WB gains are thus calculated. Accordingly, the accuracies of the integrated mean values of R and B pixels are high, and highly accurate WB gains can be calculated.

In the first embodiment, the threshold is selected on the basis of the zoom position and the f-number on actual imaging, and it is thus determined whether the imaging condition includes a high degree of color mixture or not. The implementation is not limited thereto. It may be determined whether the imaging condition includes a high degree of color mixture or not on the basis of any one of the zoom position and the f-number, and the thinning pattern may be determined on the basis of the determination result.

Second Embodiment

Figure 10:
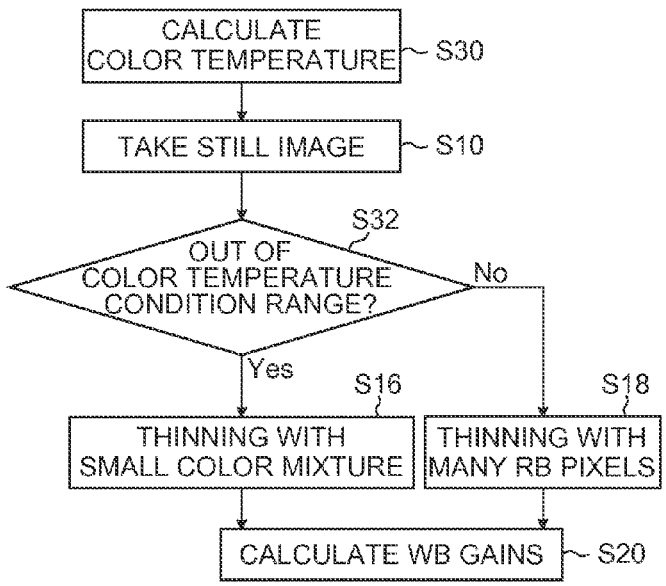
FIG. 10 is a flowchart showing a second embodiment of a method of calculating WB gains.

FIG. 10 is a flowchart showing a second embodiment of a method of calculating WB gains. The same step numerals are assigned to portions common to those of the first embodiment shown in FIG. 9. The detailed description thereof is omitted.

As shown in FIG. 10, the color temperature of environment light is calculated before actual imaging (step S30). For instance, the integrated mean value for each color is calculated on the basis of RGB color signals of image data of a live view image or image data acquired upon half-pressing of the shutter release button, and the color temperature of environment light is calculated from the calculated integrated mean value for each color.

After actual imaging, it is determined whether the color temperature calculated in step S30 is out of a range of a preset intermediate color temperature or not (step S32).

Figure 11:
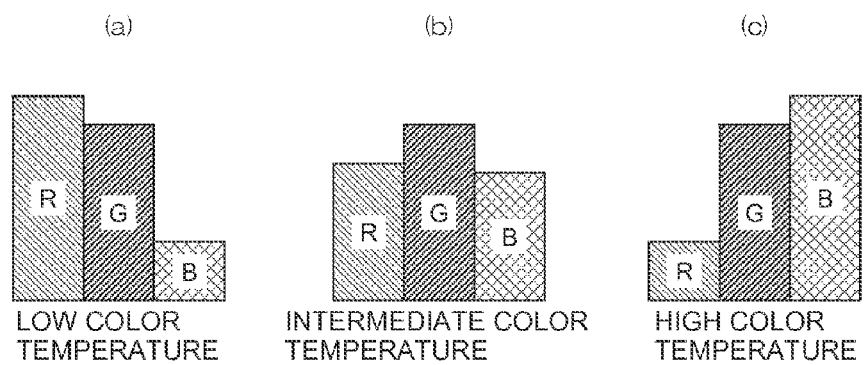
FIG. 11 is a diagram showing one example of RGB signal levels for each color temperature.

The integrated mean value for each of RGB colors at a low color temperature is R>G>B as shown in the (a) portion of FIG. 11. The integrated mean value for each of RGB colors at a high color temperature is R<G<B as shown in the (c) portion of FIG. 11.

As described above, in the case of a color temperature including a color with a low output (a low color temperature or a high color temperature), pixels with small outputs (B pixels or R pixels) are susceptible to light leakage from adjacent pixels, and calculation accuracies of WB gains tend to be low.

Thus, in step S32, if the color temperature calculated in step S30 is a color temperature out of the range of the prescribed intermediate color temperature ((b) portion of FIG. 11) (in the case of "Yes"), the range including a substantially even integrated mean value for each of RGB colors, it is determined that color mixture tends to occur, and the processing transitions to step S16. If the color temperature is within the range of the intermediate color temperature (in the case of "No"), it is determined that adverse effects of color mixture are small, the processing transitions to step S18 where lines having many R and B pixels are thinning-read.

As described above, in the case of a color temperature where color mixture tends to occur, the color signals on lines resistant to color mixture are thinning-read and WB gains are calculated. Highly accurate WB gains can thus be calculated. In the case of a color temperature resistant to color mixture, the color signals on lines having many R and B pixels are thinning-read and WB gains are calculated. The accuracies of integrated mean values of R and B pixels become high, and highly accurate WB gains can be calculated.

Third Embodiment

Figure 12:
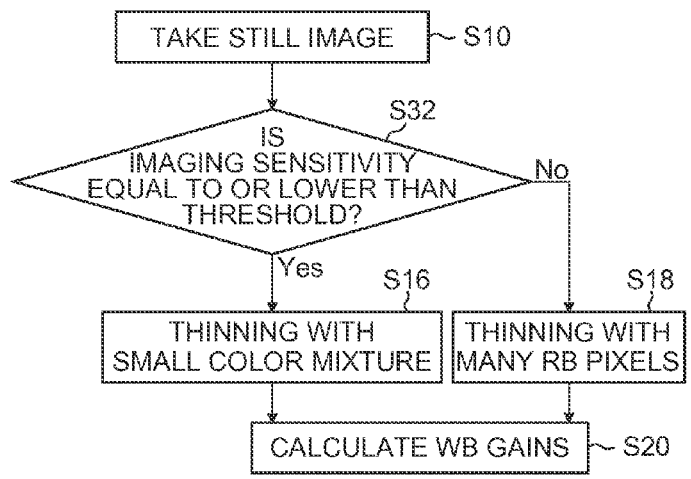
FIG. 12 is a flowchart showing a third embodiment of a method of calculating WB gains.

FIG. 12 is a flowchart showing a third embodiment of a method of calculating WB gains. The same step numerals are assigned to portions common to those of the first embodiment shown in FIG. 9. The detailed description thereof is omitted.

The CPU 40 calculates the brightness of a subject (imaging EV value) from the integrated values input from the AE detector 44 upon half-pressing of the shutter release button, determines an imaging (exposure) condition including the combination of an f-number, a shutter speed and an imaging sensitivity (ISO sensitivity) on the basis of the imaging EV value, and performs exposure control according to the exposure condition determined upon actual imaging.

If the brightness of the subject is high, the imaging sensitivity is set to be low, and exposure control is performed according to the f-number and the shutter speed. In contrast, if the brightness of the subject is low and a sufficient amount of signals cannot be acquired only with the f-number and the shutter speed, the imaging sensitivity (gain) is increased. Thus, there is a drawback in that if the imaging sensitivity is high, noise is amplified and noise thus becomes high.

In FIG. 12, it is determined if the imaging sensitivity on actual aging is equal to or lower than a prescribed threshold (i.e., whether the image includes low noise or not) (step S40). If the imaging sensitivity is equal to or lower than the prescribed threshold (in the case of "Yes"), the image includes low noise. Accordingly, high priority is given to thinning-reading on lines resistant to color mixture, and transition is made to step S16. In contrast, if the imaging sensitivity exceeds the prescribed threshold (in the case of "No"), the image includes high noise. Accordingly, high priority is given to thinning-reading on lines with many R and B pixels, which are resistant to noise, and transition is made to step S18.

In the case of an image including low noise as described above, the color signals on lines resistant to color mixture are thinning-read and the WB gains are calculated. Accordingly, highly accurate WB gains can be calculated. In the case of an image including high noise, the color signals on lines with many R and B pixels are thinning-read and the WB gains are calculated. Accordingly, the accuracies of integrated mean values of R and B pixels become high, and highly accurate WB gains can be calculated.

Fourth Embodiment

Figure 13:
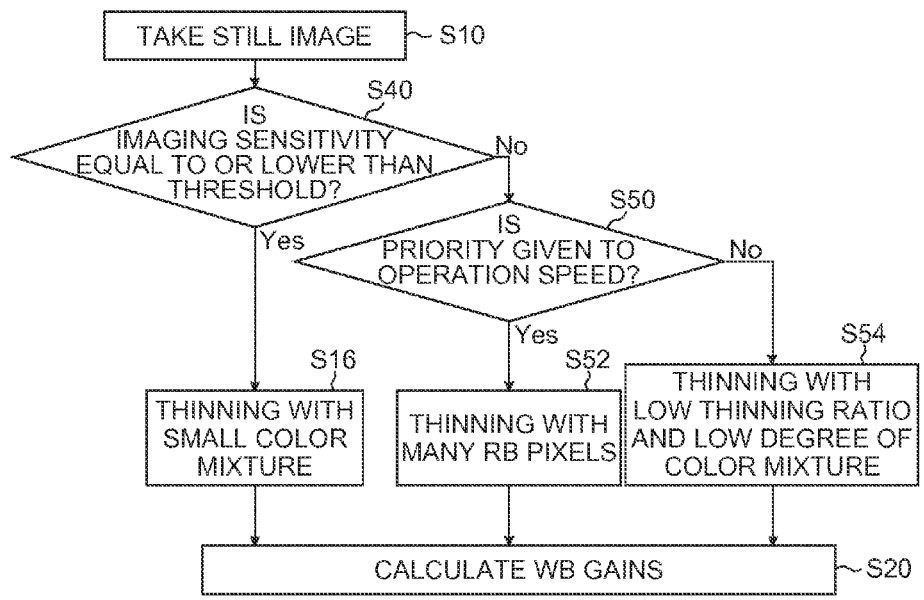
FIG. 13 is a flowchart showing a fourth embodiment of a method of calculating WB gains.

FIG. 13 is a flowchart showing a fourth embodiment of a method of calculating WB gains, and represents a modified example of the third embodiment shown in FIG. 12. The same step numerals are assigned to portions common to those of the third embodiment shown in FIG. 12. The detailed description thereof is omitted.

In the fourth embodiment shown in FIG. 13, processes on and after determination that the imaging sensitivity exceeds the prescribed threshold ("No" in step S40) are different from those of the third embodiment.

That is, if it is determined that the imaging sensitivity exceeds the prescribed threshold in step S40 ((in the case of "No"), it is subsequently determined whether priority is given to the operation speed or not (step S50).

For instance, if a consecutive imaging mode is set as an imaging mode and each of consecutively taken images are required to be processed at high speed, it is determined that priority is given to the operation speed.

If it is determined that priority is given to the speed in step S50 (in the case of "Yes"), transition is made to step S52. In step S52, a thinning pattern for thinning-reading the color signals on lines with many R and B pixels is determined, but priority is given to the speed and thus a thinning pattern with a high thinning ratio is determined. For instance, as shown in the (a) portion of FIG. 4, the thinning pattern $P_{11}$ of 1/6 thinning is determined.

In contrast, if it is determined that priority is not given to the speed in step S50 (in the case of "No"), transition is made to step S54. In step S54, a thinning pattern that has a low thinning ratio and corresponds to thinning-reading on lines resistant to color mixture is determined. For instance, the thinning pattern $P_{41}$ of 4/6 thinning shown in the (c) portion of FIG. 6 is determined. In this case, the ratios of the numbers of R and B pixels are lower than those of the G pixels. However, the thinning ratio is low. Accordingly, the numbers of R and B pixels become sufficiently high. Even if the R and B pixels include high noise, highly accurate integrated mean values can thus be acquired.

[Embodiments of Calculating Color Information]

First Embodiment

Not only a signal component corresponding to the intensity of incident light but also an offset component caused by dark current and the like are superimposed on the RGB color signals output from the image pickup device 1. In the cases of high sensitivity, high temperature, and long time exposure, a step tends to occur in an offset component owing to a dark current component in the pixels.

Figure 14:
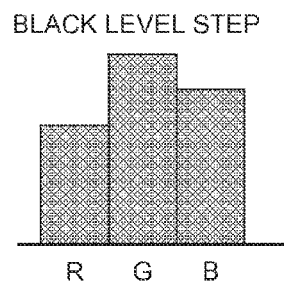
FIG. 14 is a diagram showing the case where steps (black level steps) occur between offsets of respective RGB colors.

FIG. 14 is a diagram showing the case where a step (black level step) occurs in an offset in each of RGB colors.

To address this, highly accurate WB gains are calculated by calculating color information (R/G and B/G) in consideration of this offset step.

That is, the RGB integrator 246 shown in FIG. 8 calculates offset values $R_{offset}$, $G_{offset}$ and $B_{offset}$ for the respective RGB colors. These offset values $R_{offset}$, $G_{offset}$ and $B_{offset}$ are calculated by integrating signals that are in a light shield region (optical black portion: OB portion) at a peripheral portion of the image pickup device 1 and for pixels corresponding to each of RGB, and by acquiring the mean value thereof.

Subsequently, the integrated mean values $R_{data}$, $G_{data}$ and $B_{data}$ of the respective RGB color signals thinning-read from the thinning reader 245 are calculated, and offset-corrected color information (R/G and B/G) is calculated, using the calculated offset values $R_{offset}$, $G_{offset}$ and $B_{offset}$, according to the following expressions.

$$R/G=(R_{data}-R_{offset})/(G_{data}-G_{offset})$$

$$B/G=(B_{data}-B_{offset})/(G_{data}-G_{offset}) \quad \text{[Expression 1]}$$

Thus, offset correction for each color can calculate highly accurate color information. As a result, highly accurate WB gains can be calculated.

Second Embodiment

Figure 15:
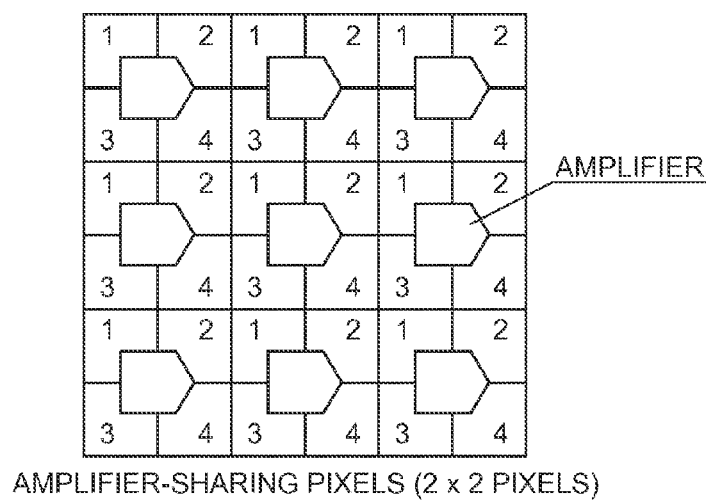
FIG. 15 is a diagram showing one example of an image pickup device having 2×2, four pixels sharing one amplifier.

In a certain implementation of a CMOS (complementary metal-oxide semiconductor) type image pickup device, amplifiers shared by pixels are embedded in a substrate for the CMOS. As shown in FIG. 15, 2×2, four pixels share one amplifier. The element structure of such an image pickup device causes differences of output levels according to positions 1 to 4 of pixels relative to the common amplifier (upper left, upper right, lower left and lower right positions relative to the amplifier).

Figure 16:
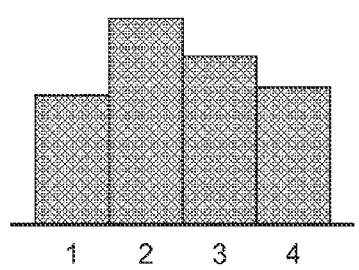
FIG. 16 is a diagram showing the case where steps (black level steps) occur between offsets at positions 1 to 4 of pixels relative to a common amplifier.

FIG. 16 is a diagram showing the case where steps (black level steps) occur in offsets at positions 1 to 4 of pixels relative to a common amplifier.

To address this, highly accurate WB gains are calculated by calculating color information (R/G and B/G) in consideration of the offset steps.

That is, the RGB integrator 246 shown in FIG. 8 calculates offset values Off1, Off2, Off3 and Off4 at the respective positions 1 to 4 of pixels relative to the common amplifier. These offset values Off1, Off2, Off3 and Off4 are calculated by integrating signals of the OB portions of the image pickup device 1 for the respective positions 1 to 4 of pixels relative to the common amplifier, and by acquiring the mean values thereof.

Subsequently, the integrated mean values $R_{data}$, $G_{data}$ and $B_{data}$ of the respective RGB color signals thinning-read through the thinning reader 245 are calculated. The integrated mean values $R_{data}$, $G_{data}$ and $B_{data}$ of the respective color signals are offset-corrected using the calculated offset values Off1, Off2, Off3 and Off4.

Figure 17:
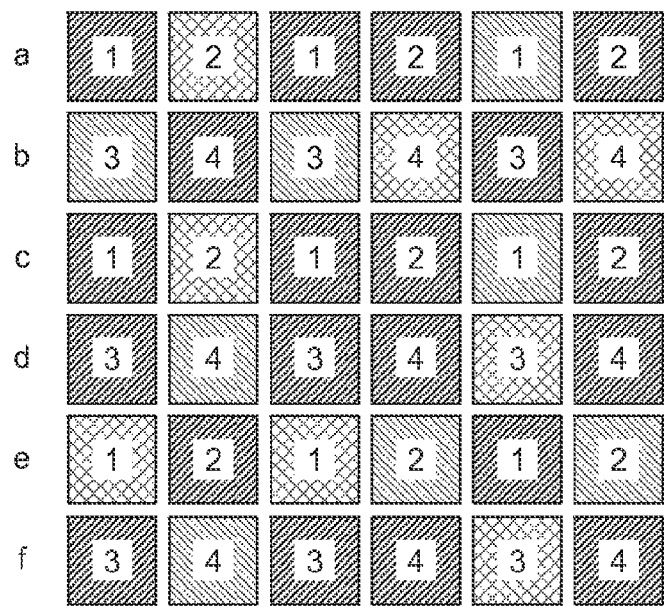
FIG. 17 is a diagram showing a relationship between pixels of respective colors in a basic array pattern and positions 1 to 4 of pixels relative to a common amplifier.
Figure 18:
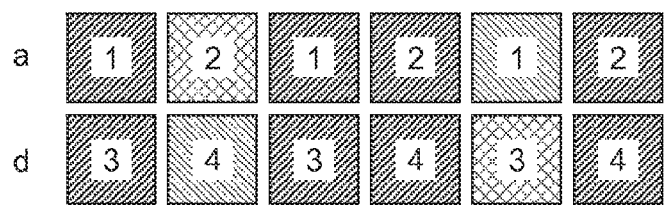
FIG. 18 is a diagram showing a relationship between pixels of respective colors on lines a and d to be 2/6-thinning read and positions 1 to 4 of pixels relative to a common amplifier.

Now, in the case where pixels of each color in the basic array pattern and the positions 1 to 4 of pixels relative to the common amplifier have relationships shown in FIG. 17, thinning-reading on lines a and d by 2/6 thinning provides relationships between the pixels on the lines a and d for each color and positions 1 to 4 of pixels relative to the common amplifier shown in FIG. 18.

That is, the positions 1 to 4 of pixels on the lines a and d for RGB relative to the common amplifier in the basic array pattern are as follows. One R pixel exists at each of the positions 1 and 4. Two G pixels exist at each of the positions 1 to 4. One B pixel exists at each of the positions 2 and 3.

Accordingly, the RGB offset values $R_{offset}$, $G_{offset}$ and $B_{offset}$ on the thinning lines a and d can be calculated on the basis of the offset values Off1, Off2, Off3 and Off4 at the positions 1 to 4 of pixels relative to the common amplifier, by the following expressions.

$$R_{offset}=(\text{Off1}+\text{Off4})/2$$

$$G_{offset}=(\text{Off1}+\text{Off2}+\text{Off3}+\text{Off4})/4$$

$$B_{offset}=(\text{Off2}+\text{Off3})/2 \quad \text{[Expression 2]}$$

The RGB offset values $R_{offset}$, $G_{offset}$ and $B_{offset}$ calculated by the above [Expression 2] are used to calculate offset-corrected color information (R/G and B/G) according to the foregoing [Expression 1].

Thus, the offset values are calculated for the respective RGB colors on the basis of the offset values Off1, Off2, Off3 and Off4 at the positions 1 to 4 of pixels relative to the common amplifier. Highly accurate color information can be calculated by correcting the integrated mean values for the respective RGB using the calculated offset values. As a result, highly accurate WB gains can be calculated.

The foregoing [Expression 2] is calculation expressions for calculating the RGB offset values $R_{offset}$, $G_{offset}$ and $B_{offset}$ on the thinning lines a and d. However, the calculation expressions for calculating the offset values $R_{offset}$, $G_{offset}$ and $B_{offset}$ are different according to one line or combinations of lines on which thinning-reading is performed. Accordingly, calculation expressions for calculating the RGB offset values $R_{offset}$, $G_{offset}$ and $B_{offset}$ are required to be prepared according to each of the thinning patterns (see FIGS. 3 to 6) determined by the thinning pattern determiner 244.

[Other]

Figure 19:
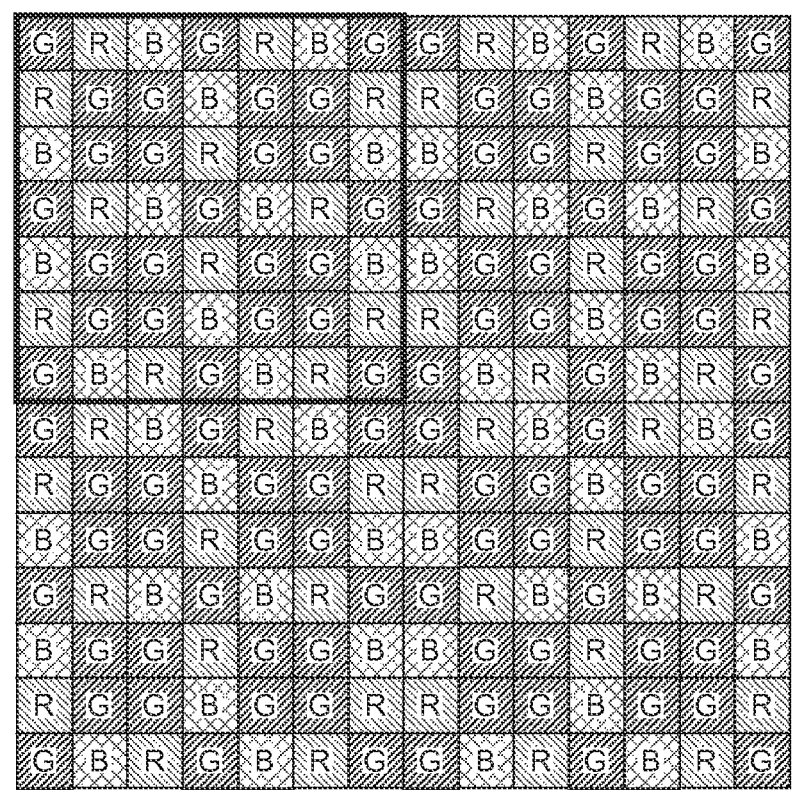
Figure 20:
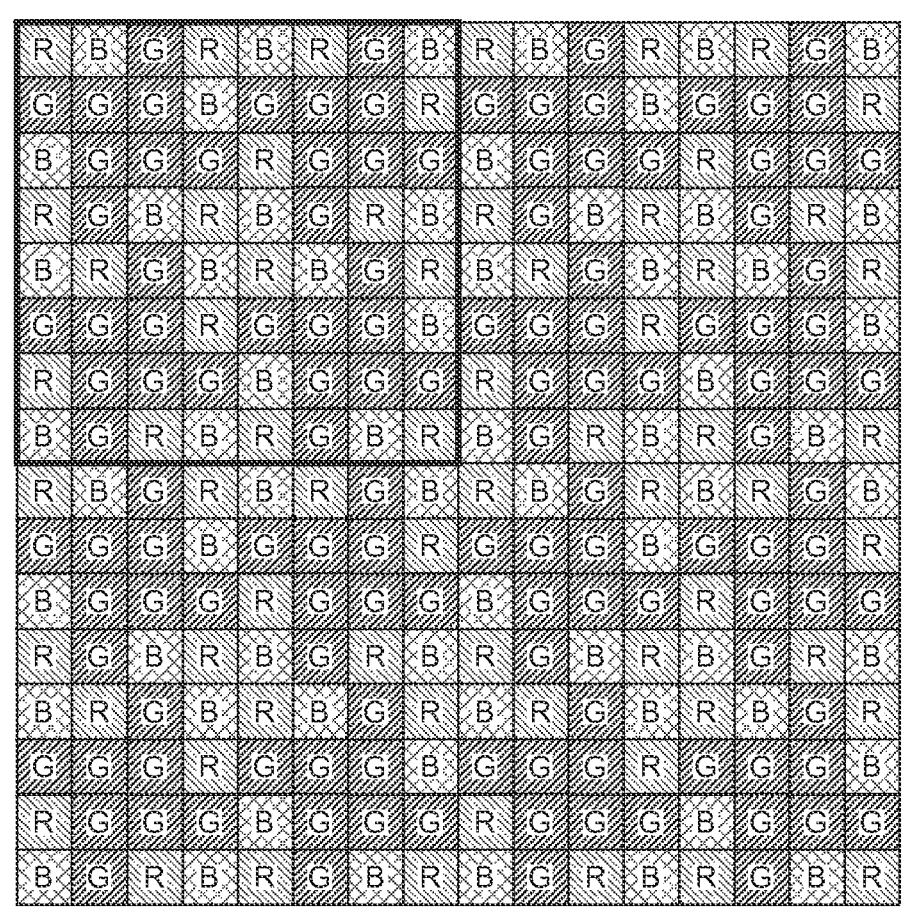

FIGS. 19 and 20 are diagrams showing another embodiment of an image pickup device adopted in an imaging apparatus according to the present invention.

A color filter array of the image pickup device of the embodiment shown in FIG. 19 includes a basic array pattern (a pattern indicated by a thick line frame) having a square array pattern corresponding to 7×7 pixels. This basic array pattern is repeatedly arranged in the horizontal direction and the vertical direction.

As with the embodiment shown in FIG. 1, in this color filter array, G filters are arranged on lines of the color filter array in the horizontal, vertical, obliquely upper right and obliquely lower right directions, and R filters and B filters are arranged on lines of the color filter array in the horizontal and vertical directions.

The number of G filters is higher than the number of R filters and the number of B filters, and the ratios of the numbers of RGB color filters are different between lines; there are lines where R:G:B=2:3:2, lines where R:G:B=2:4:1 or where R:G:B=1:4:2.

A color filter array of the image pickup device of the embodiment shown in FIG. 20 includes a basic array pattern (a pattern indicated by a thick line frame) having a square array pattern corresponding to 8×8 pixels. This basic array pattern is repeatedly arranged in the horizontal direction and the vertical direction.

As with the embodiment shown in FIG. 1, in this color filter array, G filters are arranged on lines of the color filter array in the horizontal, vertical, obliquely upper right and obliquely lower right directions, and R filters and B filters are arranged on lines of the color filter array in the horizontal and vertical directions.

The number of G filters is higher than the number of R filters and the number of B filters, and the ratios of the numbers of RGB color filters are different between lines; there are lines where R:G:B=3:2:3 and lines where R:G:B=1:6:1.

As with the basic array pattern of 6×6 pixels shown in FIG. 1, in the color filter arrays shown in FIGS. 19 and 20, the G filters corresponding to luminance pixels are thus arranged on lines of the color filter array in the horizontal, vertical, obliquely upper right and obliquely lower right directions. Accordingly, the reproduction accuracy in the demosaicing process in a high frequency region can be improved irrespective of the high frequency direction. Furthermore, the R filters and B filters are thus arranged on lines of the color filter array in the horizontal and vertical directions. Accordingly, occurrence of color moire (false color) can be suppressed.

As described above, the present invention can be applied not only to the image pickup device having the basic array pattern of 6×6 pixels shown in FIG. 1 but also to an image pickup device having another color filter array. That is, the present invention can be applied to any image pickup device in so far as the image pickup device has a color filter array where color filters of three primary colors are arranged on each line, and the ratios of the numbers of color filters of three primary colors are different between lines.

The color filter array of the image pickup device is not limited to that of RGB three primary colors. Alternatively, the array may include an yellow or emerald color.

Furthermore, in this embodiment, color information (R/G and B/G) is acquired from each of divided areas into which one screen has been divided, and the WB gains are calculated on the basis of the color information of the multiple divided areas. The method of calculating WB gains is not limited to that of this embodiment. Alternatively, any method can be adopted in so far as the method calculates WB gains on the basis of the color signals of three primary colors.

It is a matter of course that the present invention is not limited to the foregoing embodiments but various changes can be made within a range without departing from the spirit of the present invention.

What is claimed is:

1. An imaging apparatus, comprising:
   an imaging optical system;
   an image pickup device forming a subject image through the imaging optical system and including a color filter array in which color filters including three primary colors are arranged on two-dimensionally arranged photoelectric conversion elements, the color filters of three primary colors are arranged on each line and which includes a plurality of lines that include lines having uneven ratios of the numbers of color filters of the three primary colors and lines having more even ratios of the numbers of color filters of the three primary colors than the uneven ratios;
   a thinning pattern determination device for determining one thinning pattern according to an imaging condition from among a plurality of thinning patterns for selecting lines to be thinning-read from among the plurality of lines;
   a white balance gain calculation device for calculating white balance gains on the basis of color signals on lines selected according to the thinning pattern determined by the thinning pattern determination device from among color signals that correspond to the color filters on each line and have been acquired by the image pickup device;

a white balance correction device for performing white balance correction on each of the color signals acquired through the image pickup device on the basis of the white balance gains calculated by the white balance gain calculation device, and a calculation device for calculating offset values for respective color signals corresponding to color filters of the three primary colors, wherein the thinning pattern determination device determines one thinning pattern from among the plurality of thinning patterns on the basis of at least one of an f-number and an optical zoom magnification of the imaging optical system on imaging, the white balance gain calculation device calculates integrated mean values of respective color signals on lines to be used for calculating the white balance gains, subtracts offset values calculated for the respective color signals from the respective integrated mean values, and calculates the white balance gains on the basis of ratios of subtracted integrated mean values of the respective color signals, the image pickup device is an image pickup device that has an element structure of sharing an amplifier among a prescribed group of pixels, and the calculation device comprises:
   a first calculation device for calculating offset values at respective positions of the pixels sharing the amplifier relative to the amplifier; and
   a second calculation device for calculating offset values for the respective color signals on the basis of the positions of pixels relative to the amplifier in the thinning pattern determined by the thinning pattern determination device, and the offset values at the respective positions relative to the amplifier calculated by the first calculation device.

2. The imaging apparatus according to claim 1, wherein the thinning pattern determination device determines whether or not the imaging condition is a high degree of color mixture, and determines a thinning pattern for selecting lines having uneven ratios of the numbers of color filters of the three primary colors under the imaging condition of a high degree of the color mixture, and determines a thinning pattern for selecting lines having relatively even ratios of the numbers of pixels corresponding to the color filters of the three primary colors under the imaging condition of a low degree of the color mixture.

3. An imaging apparatus, comprising:
an imaging optical system;
an image pickup device forming a subject image through the imaging optical system and including a color filter array in which color filters including three primary colors are arranged on two-dimensionally arranged photoelectric conversion elements, the color filters of three primary colors are arranged on each line and which includes a plurality of lines that include lines having uneven ratios of the numbers of color filters of the three primary colors and lines having more even ratios of the numbers of color filters of the three primary colors than the uneven ratios;

a white balance gain calculation device for calculating white balance gains on the basis of respective color signals corresponding to the color filters of the respective colors on lines having relatively even ratios of the numbers of color filters of the three primary colors among the plurality of lines; and a white balance correction device for performing white balance correction on the respective color signals acquired through the image pickup device on the basis of the white balance gains calculated by the white balance gain calculation device, wherein the color filter array of the image pickup device includes a prescribed basic array pattern where first filters corresponding to a first color most contributing to acquisition of a luminance signal and second filters corresponding to second colors that are at least two colors other than the first color are arranged, and the basic array pattern is repeatedly arranged in a horizontal direction and a vertical direction, the first filters are arranged on respective lines of the color filter array in horizontal, vertical, obliquely upper right, and obliquely lower right directions, at least one of the second filters is arranged on respective lines in the basic array pattern in the horizontal and vertical directions of the color filter array, and a ratio of the number of pixels of the first color corresponding to the first filters is higher than a ratio of the number of pixels of each color of the second colors corresponding to the second filters.

4. The imaging apparatus according to claim 3, wherein the color filter array of the image pickup device includes a prescribed basic array pattern where color filters of red (R), green (G) and blue (B) are arranged, the basic array pattern is repeatedly arranged in a horizontal direction and a vertical direction, the prescribed basic array pattern is a square array pattern corresponding to 6×6 pixels, and the color filter array is configured by alternately arranging first arrays and second arrays in the horizontal direction and the vertical direction, and the first arrays correspond to 3×3 pixels and have G filters arranged at a center and four corners, and B filters arranged vertically and R filters arranged laterally sandwiching the G filter at the center, and the second arrays correspond to 3×3 pixels and have G filters arranged at a center and four corners, and R filters arranged vertically and B filters arranged laterally sandwiching the G filter at the center.

5. An imaging apparatus, comprising:
an imaging optical system;
an image pickup device forming a subject image through the imaging optical system and including a color filter array in which color filters including three primary colors are arranged on two-dimensionally arranged photoelectric conversion elements, the color filters of three primary colors are arranged on each line and which includes a plurality of lines that include lines having uneven ratios of the numbers of color filters of the three primary colors and lines having more even ratios of the numbers of color filters of the three primary colors than the uneven ratios;

a white balance gain calculation device for calculating white balance gains on the basis of respective color signals corresponding to the color filters of the respective colors on lines having relatively even ratios of the numbers of color filters of the three primary colors among the plurality of lines; and a white balance correction device for performing white balance correction on the respective color signals acquired through the image pickup device on the basis of the white balance gains calculated by the white balance gain calculation device; and a calculation device for calculating offset values for respective color signals corresponding to the color filters of the three primary colors, wherein the white balance gain calculation device calculates integrated mean values of respective color signals on lines to be used for calculating the white balance gains, subtracts offset values calculated for the respective color signals from the integrated mean values, and calculates the white balance gains on the basis of ratios of subtracted integrated mean values of the respective color signals.

* * * * *